United States Patent
Li et al.

(10) Patent No.: US 11,422,856 B2
(45) Date of Patent: Aug. 23, 2022

(54) ADAPTIVE PROGRAM TASK SCHEDULING TO BLOCKING AND NON-BLOCKING QUEUES

(71) Applicant: PayPal, Inc., San Jose, CA (US)

(72) Inventors: Xin Li, Shanghai (CN); Libin Sun, Shanghai (CN); Chao Zhang, Shanghai (CN); Xiaohan Yun, Palo Alto, CA (US); Jun Zhang, Shanghai (CN); Frédéric Tu, Shanghai (CN); Yang Yu, Shanghai (CN); Lei Wang, Shanghai (CN); Zhijun Ling, Shanghai (CN)

(73) Assignee: PayPal, Inc., San Jose, CA (US)

(*) Notice: Subject to any disclaimer, the term of this patent is extended or adjusted under 35 U.S.C. 154(b) by 249 days.

(21) Appl. No.: 16/457,631

(22) Filed: Jun. 28, 2019

(65) Prior Publication Data
US 2020/0409754 A1    Dec. 31, 2020

(51) Int. Cl.
*G06F 9/48* (2006.01)
*G06F 9/46* (2006.01)

(52) U.S. Cl.
CPC .......... *G06F 9/4887* (2013.01); *G06F 9/463* (2013.01); *G06F 9/466* (2013.01); *G06F 9/4837* (2013.01)

(58) Field of Classification Search
CPC ........ G06F 9/4887; G06F 9/463; G06F 9/466; G06F 9/4837; G06F 9/46; G06F 9/5027;
(Continued)

(56) References Cited

U.S. PATENT DOCUMENTS 8,413,161 B2 * 4/2013 Blackburn .............. G06F 9/505
                                                    718/105
9,870,256 B2 * 1/2018 Hou ......................... G06F 9/54
(Continued)

FOREIGN PATENT DOCUMENTS

CN       103488691 A  *  1/2014
CN       106408301 A  *  2/2017
(Continued)

OTHER PUBLICATIONS

Chen et al. CN106408301A Translation, Feb. 15, 2017, [database online], retrieved on [Mar. 16, 2020] Retrieved from Espacenet using Internet <URL:https://worldwide.espacenet.com/publicationDetails/biblio?CC=CN&NR=106408301A&KC=A&FT=D&ND=3&date=20170215&DB=&locale=en_EP>, pp. 1-8 (Year: 2017).*

(Continued)

*Primary Examiner* — Meng Ai T An
*Assistant Examiner* — Hsing Chun Lin
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to scheduling program tasks in a server computer system. An example server computer system is configured to maintain first and second sets of task queues that have different performance characteristics, and to collect performance metrics relating to processing of program tasks from the first and second sets of task queues. Based on the collected performance metrics, the server computer system is further configured to update a scheduling algorithm for assigning program tasks to queues in the first and second sets of task queues. In response to receiving a particular program task associated with a user transaction, the server computer system is also configured to select the first set of task queues for the particular program
(Continued)

task, and to assign the particular program task in a particular task queue in the first set of task queues.

20 Claims, 9 Drawing Sheets

(58) Field of Classification Search
CPC ......... G06F 2209/483; G06F 2209/486; G06F 2209/501; G06F 9/4881; G06Q 20/00; G06Q 20/4014
USPC ........................................................ 718/102
See application file for complete search history.

(56) References Cited

U.S. PATENT DOCUMENTS

| | | | |
|---|---|---|---|
| 2004/0139433 A1 | 7/2004 | Blythe et al. | |
| 2004/0139434 A1 | 7/2004 | Blythe et al. | |
| 2008/0112423 A1 | 5/2008 | Christenson | |
| 2013/0014114 A1 | 1/2013 | Nagata | |
| 2013/0254163 A1* | 9/2013 | Savage | G06F 16/1834 707/610 |
| 2014/0245309 A1 | 8/2014 | Otenko | |
| 2014/0245313 A1 | 8/2014 | Otenko | |
| 2017/0149875 A1* | 5/2017 | Iyengar | H04L 29/08135 |
| 2018/0018610 A1* | 1/2018 | Del Balso | G06Q 10/06316 |
| 2018/0307757 A1* | 10/2018 | Tiwary | H04L 47/2441 |
| 2019/0129787 A1* | 5/2019 | Liu | G06F 11/0757 |
| 2019/0163524 A1* | 5/2019 | Chang | G06F 9/4881 |
| 2019/0243765 A1* | 8/2019 | Noureddine | G06F 12/0804 |
| 2019/0317802 A1* | 10/2019 | Bachmutsky | G06F 9/505 |

FOREIGN PATENT DOCUMENTS

| | | | |
|---|---|---|---|
| CN | 106445651 A | * | 2/2017 |
| JP | 2013246754 A | * | 12/2013 |

OTHER PUBLICATIONS

Fan et al. CN103488691A Translation, Jan. 1, 2014, [database online], retrieved on [Mar. 16, 2020] Retrieved from Espacenet using Internet <URL:https://worldwide.espacenet.com/publicationDetails/biblio?CC=CN&NR=103488691A&KC=A&FT=D&ND=3&date=20140101&DB=&locale=en_EP>, pp. 1-14 (Year: 2014).*

Tani et al. JP2013246754A Translation, Dec. 9, 2013, [database online], retrieved on [Mar. 16, 2020] Retrieved from Espacenet using Internet <URL:https://worldwide.espacenet.com/publicationDetails/biblio?CC=JP&NR=2013246754A&KC=A&FT=D&ND=3&date=20131209&DB=&locale=en_EP>, pp. 1-24 (Year: 2013).*

Li et al. CN106445651A Translation, Feb. 22, 2017, [database online], retrieved on [Mar. 16, 2020] Retrieved from Espacenet using Internet <URL:https://worldwide.espacenet.com/publicationDetails/biblio?II=0&ND=3&adjacent=true&locale=en_EP&FT=D&date=20170222&CC=CN&NR=106445651A&KC=A>, pp. 1-11 (Year: 2017).*

* cited by examiner

_500_

Start
_501_

↓

Maintaining, by a server computer system, first and second sets of task queues that have different performance characteristics.
_510_

↓

Collecting, by the server computer system, performance metrics relating to processing of program tasks by the first and second sets of task queues.
_520_

↓

Updating, by the server computer system based on the collected performance metrics, a scheduling algorithm for assigning program tasks to queues in the first and second sets of task queues.
_530_

↓

Receiving, by the server computer system, a particular program task associated with a user transaction.
_540_

↓

Selecting, by the server computer system using the updated scheduling algorithm, the first set of task queues for the particular program task.
_550_

↓

Assigning, by the server computer system based on the selecting, the particular program task in a particular task queue in the first set of task queues.
_560_

↓

End
_590_

*FIG. 5*

ADAPTIVE PROGRAM TASK SCHEDULING TO BLOCKING AND NON-BLOCKING QUEUES

BACKGROUND

Technical Field

This disclosure relates generally to computer system operation, and more particularly to task scheduling in a server computer system.

Description of the Related Art

Server computer systems, such as web servers, application servers, email servers, etc., provide various computing resources and services to an end user. For example, a web service may use a computer system to provide access to software applications to remote users via a network. As the ubiquity of web services increases, so too does the number of tasks and data being created and transmitted between the services and end users. For example, a procedure such as logging into a server may generate hundreds or thousands of tasks depending on a level of security associated with the server. To combat identity theft and increase a level of security associated with authenticating a user, a variety of data may be accessed, analyzed, compared, and utilized to determine if the user is actually an authorized user for an account being accessed. Each step of this process may be performed by executing a number of program tasks from the server's software.

In a multi-core and/or multi-threaded processor, the program tasks may be assigned to one of a plurality of task queues to await processing by a corresponding processor core. In a server computer system, a task scheduling process, also referred to as a task scheduler, may receive a plurality of tasks associated with a particular job with a corresponding user. Each job may entail thousands of tasks to complete. A server computer system that has thousands of users, therefore, may process billions of tasks in a short time frame. Such numbers of tasks to be performed may place a heavy workload onto the task scheduler process that assigns each task to a respective task queue.

BRIEF DESCRIPTION OF THE DRAWINGS

FIG. 5 is a flow diagram illustrating an embodiment of a method for operating a scheduling algorithm using collected performance metrics.

DETAILED DESCRIPTION

Figure 1:
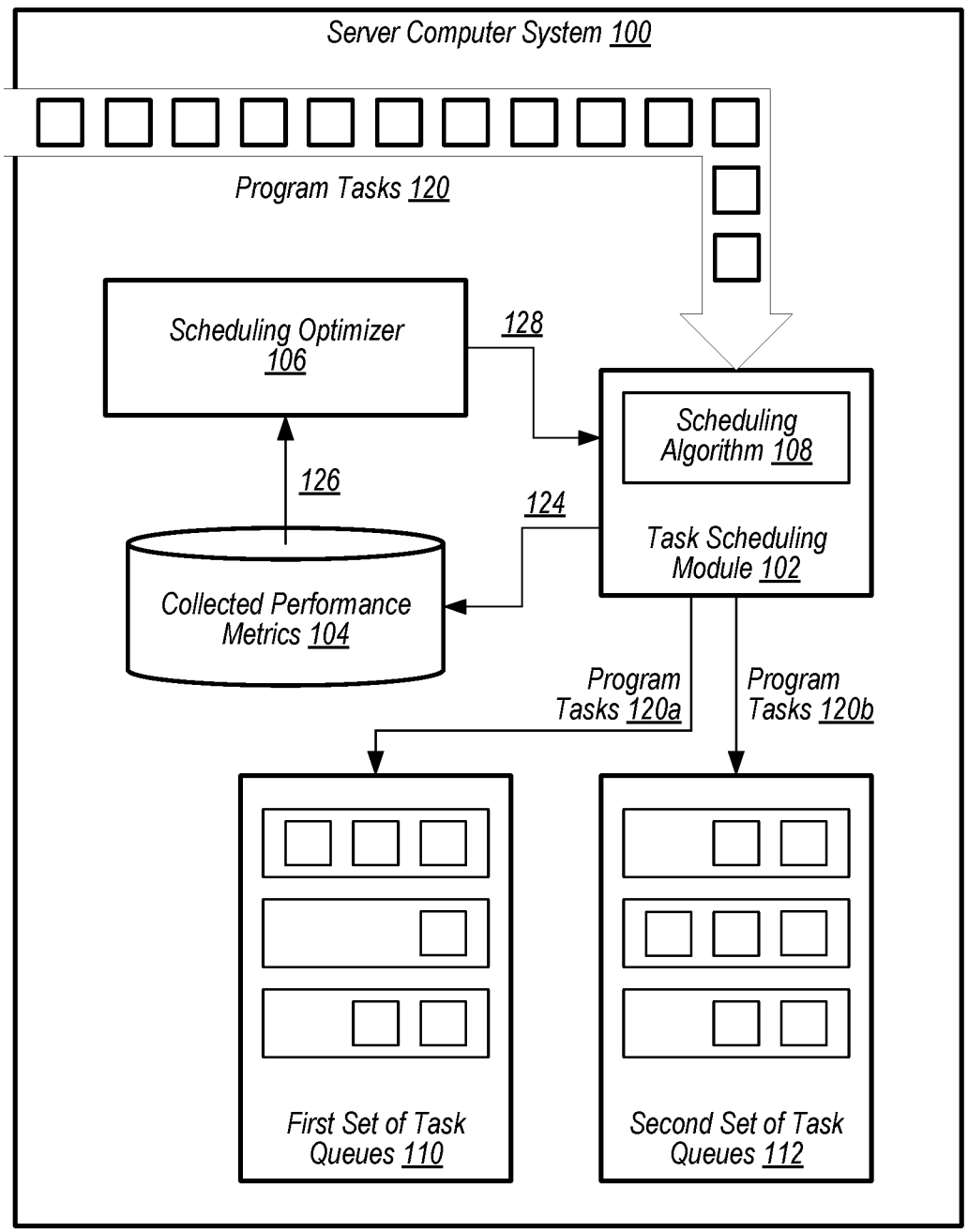
FIG. 1 illustrates a block diagram of an embodiment of a server computer system.

Server computer systems may process millions of jobs a day from users across the globe. These jobs may each include thousands of program tasks to be performed to complete the respective job. As used herein, a "job" refers to an operation initiated by an entity using the server computer system, such as a given user, or another server computer. Examples of a job may include logging into the server computer system, sending information to a different user or entity, performing a risk analysis of a transaction, completing a financial transaction, and the like. Some jobs may be completed based on an authorization that includes performing a risk analysis of the job. For example, sending sensitive information or completing a financial transaction may be completed dependent on a determination of a risk level associated with entities and actions associated with the transaction. Such a risk level may indicate a likelihood that the transaction is fraudulent. This determination may, in some instances, generate thousands of program tasks to analyze a variety of data associated with the entities involved in the transaction.

To perform what are potentially thousands of program tasks, a task scheduler process running on the server computer system may assign each task to one of a plurality of task queues to await processing by a corresponding processor core. The number of tasks to be performed is multiplied by a number of users that may be accessing the server computer system at any given time. Popular, web-based servers, therefore, may process millions or billions of program tasks every minute or less. In addition, some users may have quality of service agreements with the operators of the server computer system. As used herein, "quality of service" refers to a set of performance criteria and limits for these criteria that are agreed to by an entity operating the server computer system and another entity that is subscribing to or otherwise agreeing to use a service provided by the server computer system. The quality of service agreement may include time limits for initiating and completing particular jobs. For example, an online retailer may have an agreement with an operator of a financial transaction server to complete payments for purchases within a specified amount of time.

Accordingly, a task scheduler is desired that may efficiently distribute and assign tasks among the plurality of task queues such that tasks associated with a particular job are performed within the limits of the specified amount of time. Methods and systems are disclosed herein that may allow a server computer system to meet a variety of quality of service agreements. The disclosed methods may include maintaining, by a server computer system, first and second sets of task queues that have different performance characteristics. The server computer system collects performance metrics relating to processing of program tasks by the first and second sets of task queues. Based on the collected performance metrics, the server computer system updates a scheduling algorithm for assigning program tasks to queues in the first and second sets of task queues. The server computer system receives program tasks and schedules them into particular queues based on the updated algorithm.

As used herein, "performance characteristics" refer to how a task queue manages a flow of program tasks that are assigned to the task queue. One example of a performance characteristic is whether processing of subsequent program tasks is blocked while a particular program task is currently processing. As used herein, "blocking queue" blocks progress of the subsequent program tasks in the task queue during processing of the particular program task. Also as used herein, a "non-blocking queue" allows progress of the subsequent program tasks in the task queue during processing of the particular program task. If, for example, the particular program task includes a memory fetch from a database with a long-lead time (e.g., hundreds of processor clock cycles), then the processor core that is executing the particular program task may be idle, and therefore capable or processing other program tasks. If the particular program task is from a blocking queue, then the subsequent program tasks may not be processed until the particular program task has completed. In contrast, if the particular program task is from a non-blocking queue, then the processor core may retrieve a next program task in the non-blocking queue to process.

As another example, a given set of two or more program tasks may share a data dependency. A first program task may retrieve a particular dataset from a database and then provide this dataset to a subsequent second program task which then processes the dataset. In some cases, the second program task may be written such that it cannot begin execution until the first program task has completed execution and the dataset is available. In this case, the first and second program tasks may be placed into a blocking queue to prevent the second program task from starting execution until the first program task is executed. In other cases, the second program task may be written with a callback that allows the execution of the second program task to begin before the dataset is retrieved. In such a case, the second program task may be placed into a non-blocking queue. If the second program task begins execution before the dataset is available, the second program task may be paused, allowing other subsequent program tasks to execute until the dataset is available.

In addition to blocking characteristics, another example of a performance characteristic includes in-order versus out-of-order task assignment. In an "in-order" task queue, program tasks are retrieved and processed by a processor core in the order that the program tasks were placed into the task queue. In an "out-of-order" task queue, the processor core may retrieve and process program tasks in a different order. For example, a given program task may utilize a particular processor resource or memory circuit, thereby making the particular resource or memory unavailable for other tasks until the given program task completes. With an in-order task queue, if the next program task in the task queue utilizes the particular resource or memory, then the processor core stalls until the given program task completes and the particular resource or memory is available. With an out-of-order task queue, if the next program task to be retrieved from the task queue utilizes the particular resource or memory, then the processor core may proceed to subsequent program tasks in the task queue until a program task that does not utilize the particular resource or memory is identified and then retrieved. Both blocking characteristics, and in-order/out-of-order characteristics may be considered as different types of performance characteristics for task queues.

An embodiment of a server computer system is shown in FIG. 1. Server computer system 100 may correspond to any suitable networked computer system capable of receiving jobs from a plurality of authorized users. As illustrated, server computer system 100 includes task scheduling module 102, collected performance metrics 104, scheduling optimizer 106, a first set of task queues 110 and a second set of task queues 112. Task scheduling module 102 further includes scheduling algorithm 108.

Server computer system 100 may be configured in some instances to host one or more web-based services. In various embodiments, server computer system 100 may include one computer or a plurality of computers to implement the web-based services. Server computer system 100, as shown, receives a plurality of program tasks 120. Program tasks 120 may correspond to tasks performed to accomplish one or more jobs initiated by one or more entities, for example, corresponding users logged into server computer system 100.

Server computer system 100 maintains a first set of task queues 110 and a second set of task queues 112. In the illustrated embodiment, the first set of task queues 110 have different performance characteristics than the second set of task queues 112. For example, the first set of task queues 110 may include a set of blocking queues, while the second set of task queues 112 may include a set of non-blocking queues. In other examples, the first set of task queues 110 may include a set of in-order queues, and the second set of task queues 112 may include a set of out-of-order queues. Program tasks 120 are received by task scheduling module 102 and then assigned, using scheduling algorithm 108, to a bottom of a task queue in either the first set of task queues 110 or the second set of task queues 112. An assigned one of program tasks 120 waits in the assigned task queue until it reaches the top of the assigned task queue and is then pulled by a particular processor core (not illustrated) for execution.

Scheduling algorithm 108 includes information and procedures used to assign each of program tasks 120 to either the first or second sets of task queues 110 and 112, and to further assign program tasks 120 to a particular one of the task queues in the selected set. The information included in scheduling algorithm 108 includes data for estimating execution times for program tasks 120. In addition, scheduling algorithm 108 may include one or more threshold values that may be compared to the estimated execution times when selecting a particular set of task queues for a program task. Scheduling algorithm 108 includes procedures for assigning a program task to a particular task queue within the selected set. Various criteria may be used to select a particular task queue for a given program task, such as a particular job associated with the given program task, a priority level associated with the given program task, a current number of program tasks assigned to each task queue, an estimated time to execute the assigned program tasks in each task queue, and the like. For example, scheduling algorithm 108 may include a mapping between particular jobs and particular task queues. In some embodiments, an initial mapping may be established using a first available task queue when a first program task for a given job is being scheduled. As further program tasks for the given job are scheduled, they may be assigned to the same task queue used for the first program task. In other embodiments, particular types of jobs may be assigned to respective task queues.

Server computer system 100 collects performance metrics relating to processing of program tasks from the first set of task queues 110 and from the second set of task queues 112. For example, task scheduling module 102 may monitor execution times of assigned ones of program tasks 120 that have been executed by a processor core. The execution times and other performance metrics 124 may then be stored in a memory as collected performance metrics 104. Server computer system 100 may then use collected performance metrics 104 to update scheduling algorithm 108. Scheduling optimizer 106, retrieves at least a portion, as indicated by reference 126, of collected performance metrics 104 and may determine if the metrics support making a change to how program tasks 120 are scheduled. For example, if the first set of tasks queues 110 are filling up while the second set of task queues 112 have additional space, then scheduling optimizer 106 may implement changes 128 to scheduling algorithm 108.

To update scheduling algorithm 108, scheduling optimizer 106 may update the values used to estimate execution times, modify the threshold values that are compared to the estimated execution times. In addition, scheduling optimizer 106 may adjust a mapping of program tasks for a particular job to a different task queue or subset of task queues, prioritize or deprioritize program task assignments to particular task queues based on current numbers of program tasks assigned to those task queues or the current estimated execution time for the assigned program tasks, as well as other similar updates. For example, an initial mapping of jobs to task queues may be adjusted in response to determining that a first task queue is currently holding a particular number more of the program tasks than a second task queue. Such an adjusted mapping may improve a respective distribution of assigned program tasks across each of the first and second sets of task queues 110 and 112.

After server computer system 100 receives a particular one of program tasks 120, task scheduling module 102 may, based on the updated scheduling algorithm 108, estimate an execution time for the particular program task. The estimated execution time may be based on collected execution times for similar tasks that have been executed. In addition, task scheduling module 102 may determine if other factors impact the execution time, such as an availability of data that is associated with the task. For example, if associated data has been used previously, then the data may be cached locally and therefore, may be read quickly. The estimated execution time may be reduced in such a case. If, in contrast, the data is not cached or otherwise available locally, then the execution time may be increased based on an expected time to fetch the data. For example, the data may be located in a remote database and, therefore, may be fetched using network requests, thereby taking longer than a local memory access.

Task scheduling module 102 may then select, using the updated scheduling algorithm 108, the first set of task queues 110 for the particular program task. As illustrated, the ones of program tasks 120 with estimated execution times that are greater than a threshold amount of time are stored in the first set of task queues 110. Similarly, the ones of program tasks 120 with estimated execution times that are less than a threshold amount of time are stored in the second set of task queues 112. The first set of task queues 110, therefore, may store ones of program tasks 120 that are estimated to take longer to execute.

Task scheduling module 102 assigns, based on the selecting of the first set of task queues 110, the particular program task in a particular task queue in the first set of task queues 110. The assigning may be based on a variety of factors, such as a number of current program tasks currently assigned to each task queue in the first set of task queues 110, an estimated total execution time for all tasks currently assigned to each task queue, a quality of service value associated with the particular program task, and the like. By collecting performance metrics 104 and using them to adjust a scheduling algorithm 108, server computer system 100 may be able to schedule and execute program tasks 120 more quickly, thereby allowing server computer system 100 provide efficient services to users and to meet or exceed contracted quality of service agreements.

It is noted that the embodiment of FIG. 1 is merely an example. Elements have been omitted for clarity. For example, other embodiments may include one or more processing cores used to execute the program tasks. Such an embodiment is shown in FIG. 2.

Figure 2:
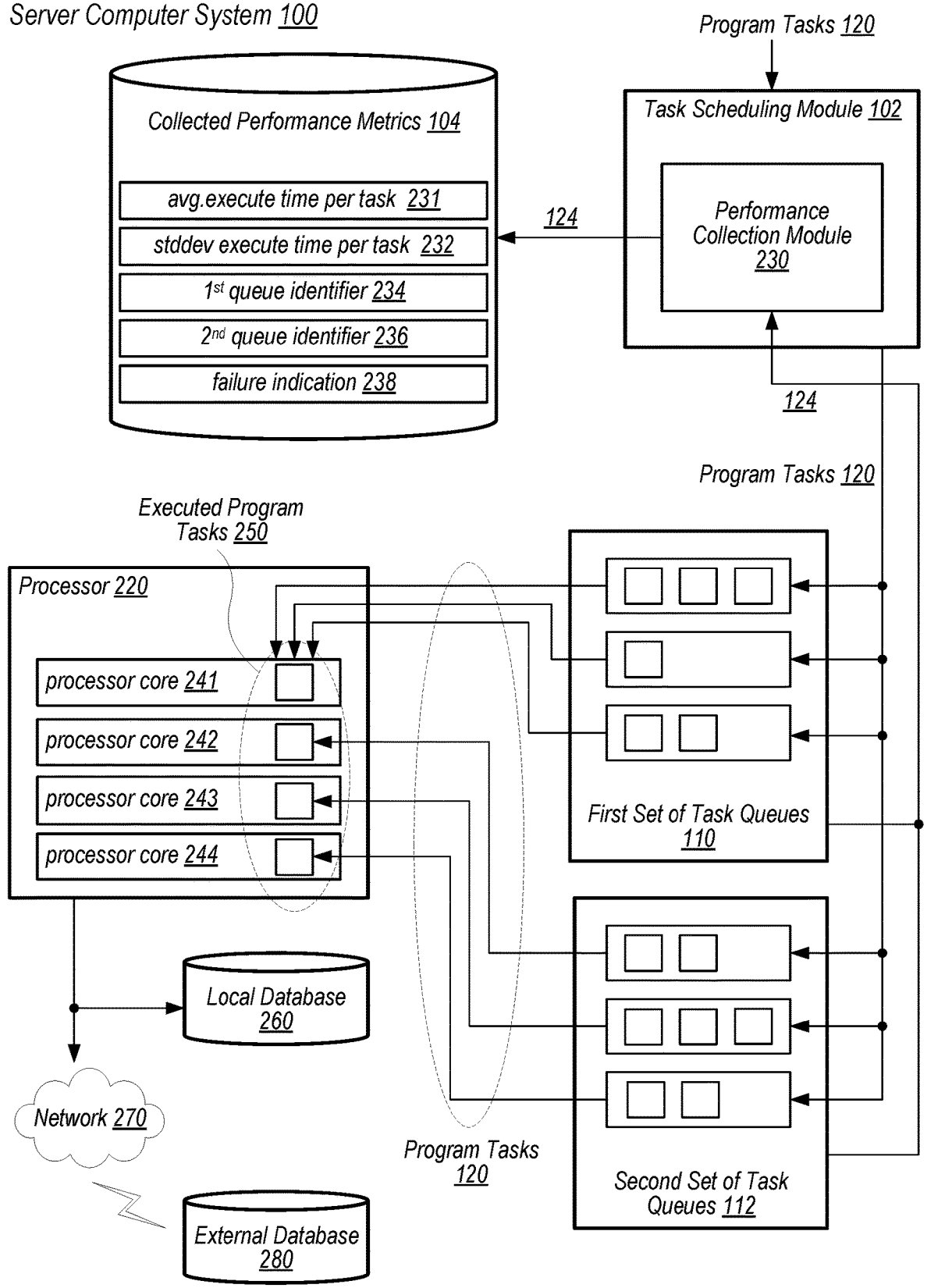
FIG. 2 shows a block diagram of an embodiment for collecting performance metrics in a server computer system.

Turning to FIG. 2, an embodiment of server computer system 100 is shown that includes a multi-core processor. The embodiment of FIG. 2 illustrates how program tasks may be assigned and executed, and how performance metrics associated with the execution of the program tasks may be collected. Server computer system 100 includes elements shown in FIG. 1, such as task scheduling module 102, collected performance metrics 104, a first set of task queues 110, and a second set of task queues 112. As shown, server computer system 100 also includes processor 220 which further includes hardware circuits for processor cores 241-243.

As disclosed above, program tasks 120 may correspond to tasks performed to accomplish one or more jobs initiated by one or more entities. A particular job may include any number of program tasks. A sequence of one or more program tasks may be grouped into a particular process thread. As used herein, a "process thread" refers to a group of one or more sequentially issued program tasks that combine to perform a particular operation. For example, a plurality of program tasks may be executed to receive a portion of user input data and compare that user input data to a stored value. This plurality of program tasks may, in some embodiments, be processed sequentially as a process thread. Accordingly, a job may be divided into a plurality of process threads. Each of the process threads may be further subdivided into a number of program tasks. Task scheduling module 102 may maintain a mapping that associates received program tasks 120 with corresponding process threads and corresponding jobs. Task scheduling module 102 may use this mapping as one of a plurality of criteria for scheduling the program tasks 120 into a selected one of the first and second sets of task queues.

Task scheduling module 102 receives program tasks 120 and assigns each program task to a task queue in the first set of task queues 110 or in the second set of task queues 112. One or more criteria may be used to selected between the first and second sets of task queues 110 and 112. As disclosed above, program tasks that have estimated execution times that are greater than a threshold amount of time may be assigned to the first set of task queues 110 while the program task with execution times less than or equal to the threshold amount of time are assigned to the second set of task queues. This threshold may be established based on simulations or estimations for execution times for various types of program tasks. In some embodiments, the threshold may be adjusted, for example, based on current numbers of program tasks assigned to each of the first and second sets of task queues 110 and 112.

In addition, criteria such as a location of data to be used in a program task may be used to select between the first and second sets of task queues 110 and 112. Processing cores 241-244, as illustrated, may access local database 260 and external database 280. Local database 260 includes data storage circuits that may be located onsite with server computer system 100 or that may be included as a part of server computer system 100. External database 280 may be located offsite from server computer system 100 and is accessed via network 270. Processing cores 241-244, therefore, may be able to access data from local database 260 with less latency than accesses to external database 280. For example, a given program task that uses data that will be retrieved from external database 280 may be assigned to the first set of task queues 110, while a different program task that uses data retrieved from local database 260 may be assigned to the second set of task queues 112.

In some embodiments, task scheduling module 102 may assign only program tasks associated with a same job into any given one of the task queues. In other embodiments, task scheduling module may further limit assignment, into a given one of the task queues, to program tasks that are from a same process thread. Such a limitation may help to maintain execution order of the program tasks of the given process thread, and may avoid progress of the given process thread from being stalled behind a program task of a different process thread.

The three queues shown for the first set of task queues 110 are assigned to processor core 241. Program tasks from the first set of task queues 110 are retrieved and executed by processor core 241. As disclosed above, program tasks assigned to the first set of task queues are the ones of program tasks 120 that have estimated execution times that are greater than a threshold amount of time. Processor core 241 may execute the program tasks in a selected one of the first set of task queues 110 until a given one of these program tasks blocks further progress. For example, the given program task may include a memory fetch from a database that is external to server computer system 100, and therefore may take a relatively long time to complete (constituting what is referred to herein as a "core stall," or simply a "stall"), allowing processor core 241 to begin execution of a different program task while waiting for the memory fetch to the external database to complete. If selected task queue is a blocking queue or an in-order queue, then processor core 241 may select a different one of the first set of task queues from which to retrieve the next program task to execute. Processor core 241 may switch back to the previously selected task queue after the given program task completes. By switching between program tasks with long estimated execution times, processor core 241 may be able to execute program tasks associated with multiple process threads rather than stalling while waiting for program tasks with long execution times to complete, thereby reducing an overall execution time for all of the process threads compared to executing each process thread sequentially.

The three task queues shown for the second set of task queues 112 each are linked to respective ones of processor cores 242, 243, and 244. Since each of the task queues in the second set of task queues 112 is linked to a respective processor core, processor cores 242, 243, and 244 do not switch to a different task queue if a currently executing program task causes a core stall. As disclosed above, however, program tasks assigned to the second set of task queues are the ones of program tasks 120 that have estimated execution times that are less than the threshold amount of time. Accordingly, few, if any, of the program tasks assigned to the second set of task queues are expected to cause core stalls. The program tasks in each of the second set of task queues should therefore generally execute in an acceptable amount of time to meet or exceed user expectations and quality of service goals.

As stated, program tasks 120 are assigned to either the first set of task queues or the second set of task queues based on respective estimated execution times for each program task. To monitor actual execution times for the executed program tasks 250, task scheduling module 102 includes performance collection module 230. Performance collection module 230 receives information from the first set of task queues 110 and the second set of task queues 112 regarding execution of executed program tasks 250. For example, performance collection module 230 may receive information such as execution start and stop times for each of executed program tasks 250 thereby providing an indication of the execution time for the respective tasks. Additional information may include identification of a type of task for each executed task, an identifier for the particular task queue, and/or processor core that executed each of executed program tasks 250. In some embodiments, an identifier for a particular hardware thread (e.g., a particular set of hardware in a processor core) that was used in the identified processor core is collected.

Performance collection module 230 collects and analyzes the information and stores various metrics as collected performance metrics 104. Examples of the performance metrics generated from the collected information include average execution time per task 231, standard deviation of execution times per tasks 232, first queue identifier 234, second queue identifier 236, and failure indication 238. Average execution time per task 231 may be determined based on a number of executions of a same type of program task. Performance collection module 230 may identify a particular type of program task using information maintained by task scheduling module 102. The particular type of task may, for example, correspond to various reads of a particular type of data from a particular database, such as reading a user account number from a local user account database, or retrieving third party ratings from an external database. Along with the averages and standard deviations for execution times, identifiers for the particular task queue are collected. In some embodiments, this information may be presented as a number of times each type of program task is executed by each task queue in the first and second sets of task queues 110 and 112.

In some cases, an executed program task may fail to be performed correctly. A system error, unavailable data, improper data (e.g., a value outside of a specified range, or in an incorrect format), a network error, and the like, may result in a program task that is unable to execute correctly, and an error value may be generated accordingly. Failure indication 238 may be set or incremented in response to detecting the error value after execution of a particular program task. In some embodiments, subsequent occurrences of the same type of program task may be assigned to the first set of task queues 110 regardless of an estimated execution time for the program task.

It is noted that server computer system 100 of FIG. 2 is an example for demonstrating the disclosed concepts. Although three queues are shown in each of the first and second sets of task queues, any suitable number of task queues may be included in each set. Four processor cores are illustrated, however, any suitable number may be included and the number of task queues assigned to each processor core may be different. In other embodiments, the collected performance metrics may include a different set of metrics, such as minimum and/or maximum execution times per task.

The embodiment of FIG. 2 illustrates how performance metrics may be collected. These collected metrics may be utilized to adjust a scheduling algorithm for assigning the program tasks to respective ones of the first and second sets of task queues. An embodiment demonstrating use of the collected metrics is shown in FIG. 3.

Figure 3:
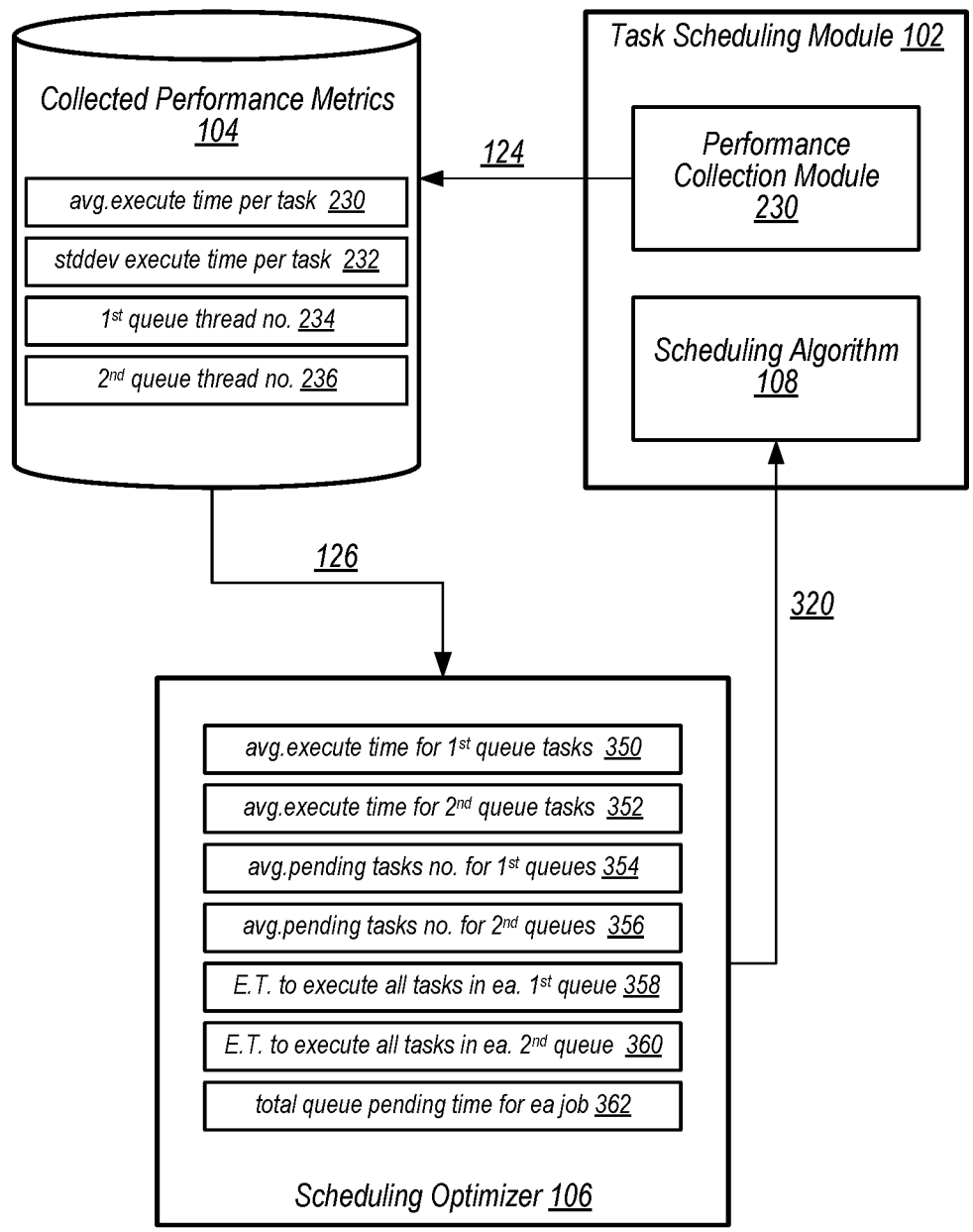
FIG. 3 depicts a block diagram of an embodiment of a server computer system that operates a scheduling algorithm using collected performance metrics.

Moving to FIG. 3, a block diagram showing how collected performance metrics may be used to adjust a scheduling algorithm is presented. As previously shown, server computer system 100 includes task scheduling module 102, collected performance metrics 104, and scheduling optimizer 106. Task scheduling module 102 further includes scheduling algorithm 108 and performance collection module 230, both described above.

Scheduling optimizer 106 retrieves at least a portion, as indicated by reference 126, of collected performance metrics 104 and may use this information to update information regarding performance of task execution and workflow efficiency within server computer system 100. Scheduling optimizer 106 may track, for example, an average execution time for program tasks assigned to the first set of task queues (avg. execution time for first queue tasks) 350, an average execution time for program tasks assigned to the second set of task queues (avg. execution time for second queue tasks) 352, an average of the number of program tasks assigned to each task queue in the first set of task queues 110 (avg. pending tasks no. for first queues) 354, and an average of the number of program tasks assigned to each task queue in the second set of task queues 112 (avg. pending tasks no. for second queues) 356. Furthermore, scheduling optimizer 106 may track a summation of the estimated time for each program task currently pending in the first set of task queues 110 (E.T. to execute all tasks in each first queue) 358, as well as a summation of the estimated time for each program task currently pending in the second set of task queues 112 (E.T. to execute all tasks in each second queue 360, and total queue pending time for each job 362.

Average execution time for first queue tasks 350 and average execution time for second queue tasks 352 correspond to overall averages for the execution times for program tasks assigned to the first set of tasks queues 110 and the second set of task queues 112, respectively. Such values may provide indications for how quickly program tasks are processed through each of the first and second sets of task queues 110 and 112, thereby determining an execution rate for each set of task queues.

Average pending tasks number for first queues 354 tracks an average of the number of program tasks assigned to, and waiting in each task queue in the first set of task queues 110. Similarly, average pending tasks number for second queues 356 tracks an average of the number of program tasks waiting in each task queue in the second set of task queues 112. These pending tasks numbers 354 and 356 may provide an indication of how full each of the task queues are getting during processing of program tasks 120.

Estimated time to execute all tasks in each first queue 358 and estimated time to execute all tasks in each second queue 360, are summations of the estimated execution times for each program task assigned and currently pending in each of the task queues in the first and second sets of task queues 110 and 112. For each task queue, the previously determined estimated execution times are added together, thereby providing an indication of how much time for the respective task queue to reach the last program task at the bottom of the task queue.

Total queue pending time for each job 362 corresponds to a total amount of time that all program tasks associated with a particular job spent waiting in their respective task queues. Since a given job may have a plurality of program tasks that are split between the first and second sets of task queues, total queue pending time for each job 362 may provide an indication of how efficiently server computer system 100 is performing each job.

As more program tasks are executed, mode collected performance metrics 104 are available for scheduling optimizer 106 to analyze. This continued analysis may allow scheduling optimizer 106 to detect changes in performance and repeat updates 320 to scheduling algorithm 108 accordingly. For example, if scheduling optimizer 106 determines that a particular one of the first set of task queues 110 has longer task pending times than the other task queues in the first set, then scheduling optimizer 106 may adjust scheduling algorithm 108 to assign fewer program tasks to the particular one task queue until its task pending times are more in line with the other task queues of the first set. In some embodiments, an update to scheduling algorithm 108 may result in task scheduling module 102 reassigning a previously assigned program task from a first task queue to a second task queue in the same set of task queues. For example, a particular program task may be assigned to a particular one of the first set of task queues based on the particular task queue having a low estimated execution time for all the currently assigned program tasks. After a latest update to scheduling algorithm 108, however, the estimated execution time for all the currently assigned program tasks in the particular task queue may increase (e.g., a database associated with one or more currently assigned program tasks may have an increased latency for fulfilling access requests). In response to the increased execution time for the program tasks pending in the particular task queue, task scheduling module 102 may reassign the particular program task in order to meet a quality of service level associated with the particular program task.

In addition, scheduling optimizer 106 may detect whether a particular program task from a particular task queue is taking longer than estimated to execute. In response to this determination, one or more program tasks waiting for the particular program task to complete execution may be reassigned to a different task queue in the same set of task queues. Such a reassignment may be based on priorities of the pending program task waiting in the particular task queue. For example, a first program task and a second program task are assigned to a first task queue in the first set of task queues 110, and placed behind a third program task that is pending in the first task queue. After the third program task starts execution, scheduling optimizer 106 detects that the third program task is taking longer than its estimated execution time to complete (e.g., the estimated execution time for the third program task is 500 milliseconds and the current actual execution time is 900 milliseconds and counting).

Scheduling optimizer 106 may analyze the first and second program tasks and determine if either one should be reassigned to a different one of the first set of task queues. Scheduling optimizer 106 may utilize several criteria to make the determination, such as a number of pending program tasks in each of the other task queues, an estimated time to execute pending program tasks in each of the other task queues, and priorities associated with the first and second program tasks. If the first program task has a higher priority than the second program task (e.g., the first program task is associated with a job with a high quality of service level, while the second program tasks is associated with a lower quality of service level) then the first program task may be reassigned to a different one of the first set of task queues while the second program task remains assigned to the first task queue. The different task queue may be selected due to having a least number of pending program tasks and/or due to having a lowest estimated time to execute pending program tasks.

If scheduling algorithm 108 includes a mapping of jobs to particular ones of the first set of task queues 110, then scheduling optimizer 106 may update this mapping based on the utilized criteria. This updating may include subsequent program tasks from the same job as the first program task being reassigned from the particular task queue to the different task queue.

After server computer system 100 initially starts or after a system reset or reboot, performance collection module 230 may have an insufficient number of collected performance metrics stored in order to make a suitably accurate estimate of execution times. During such an initialization period, task scheduling module 102 may default to assigning all program tasks to the first set of task queues 110 until a sufficient number of performance metrics have been collected. Once a suitable number of performance metrics have been collected, then scheduling algorithm 108 may be updated, execution times may be estimated, and the second set of task queues 112 may be selected based on at least an execution time threshold.

As more performance metrics are collected, a balance between a first number of program tasks assigned to the first set of task queues 110 and a second number of program tasks assigned to the second set of task queues 112 may need to be adjusted. To adjust the first and second numbers, scheduling optimizer 106 may adjust the execution time threshold used to select either the first or second sets of task queues 110 and 112. Increasing the execution time threshold may result in an increase to the second number and a corresponding decrease to the first number, and vice versa.

It is noted that the illustrated blocks in FIG. 3 are simplified for clarity. In other embodiments, additional blocks may be included. For example, scheduling optimizer 106 may be implemented as several blocks, such as separate optimizers for tracking performance of each of the first and second sets of task queues.

The embodiments of FIGS. 1-3 illustrate functional blocks and operations associated with program task assignment in a server computer system. The disclosed concepts may be utilized in a networked system for receiving a plurality of jobs from a plurality of users, and scheduling program tasks associated with the plurality of jobs. Such an embodiment is shown in FIG. 4.

Figure 4:
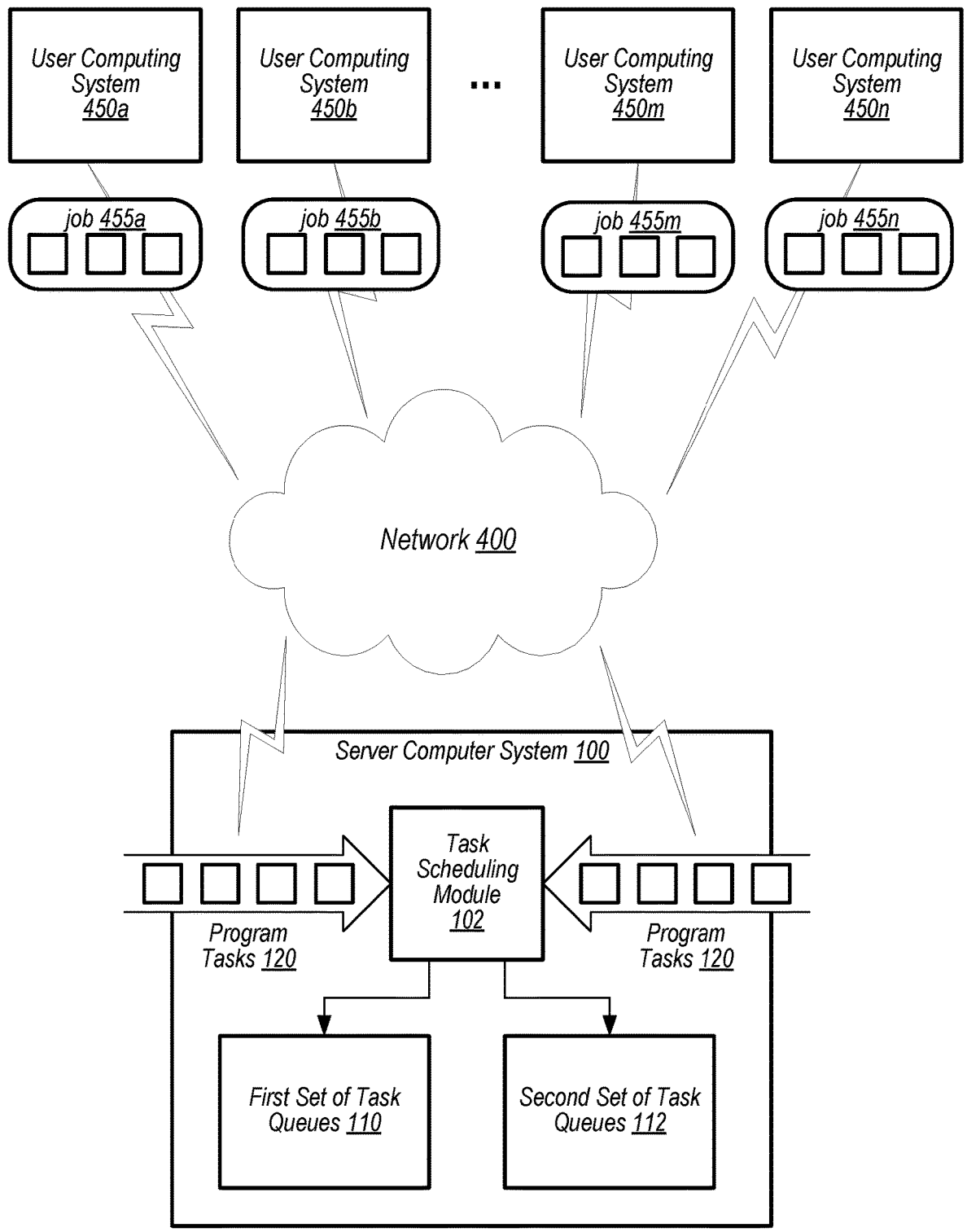
FIG. 4 illustrates a block diagram of an embodiment of a networked system including a server computer system and a plurality of user computing systems.

Proceeding to FIG. 4, a block diagram depicting a server computer system coupled to a plurality of user computing systems via a network is illustrated. FIG. 4 includes network 400 coupling server computer system 100 to each of user computer systems 450a-450n (collectively referred to as user computing systems 450). Each user computing system 450 is shown submitting, using network 400, a respective job 455a-455n (collectively jobs 455) to server computer system 100.

Server computer system 100 may host any suitable web service, such as financial services, online shopping, cloud services, and the like. User computing systems 450 access the web service via network 400. As users interact with the web services, one or more jobs may be created, for example, financial transactions to transfer funds from one user to another user. Such a transaction may create several jobs, such as authenticating the user initiating the fund transfer, verifying sufficient funds for the transfer, and verifying account information for the user receiving the funds. Each job may include a plurality of program tasks. For example, verifying that an initiating user is really an authorized user of an account and not a hacker attempting an unauthorized fund transfer may generate thousands or tens of thousands of program tasks to search a variety of records associated with authorized users to determine if information and actions received from the initiating user accurately match information and actions of an approved user. In addition, server computer system 100 may receive jobs from the plurality of user computing systems 450 in parallel, resulting in hundreds of thousands, millions or more of program tasks to process.

As illustrated, user computing systems 450 send respective jobs 455 to server computer system 100 to be processed. Each job 455 includes a plurality of program tasks 120 that are received by task scheduling module 102 to be assigned to a respective task queue in the first set of task queues 110 or the second set of task queues 112, as described above. As part of scheduling a given program task, one parameter that task scheduling module 102 may utilize for selection of a particular task queue within a selected one of the first set and second set of task queues 110 and 112 is a quality of service associated with the given program task. Server computer system 100 may have a different level of quality of service for each respective user of user computing systems 450. Each job 455 is assigned a respective quality of service level based on an agreed-upon level with the corresponding user. Program tasks 120 receive the quality of service level that is assigned to the associated job 455.

Program tasks 120 that are associated with a same job 455 may be assigned to different ones of the first and second sets of tasks queues based on, e.g., estimated execution times for each program task 120. In addition, program tasks 120 that are associated with a same job 455 and assigned to a same set of task queues, such as the first set of task queues 110, may be assigned to different task queues within the same set in order to meet the assigned quality of service level. By assigning program tasks using the disclosed concepts, server computer system 100 may increase a level of efficiency for completing received jobs and be capable of meeting or exceeding quality of service agreements with a variety of authorized users.

Example Methods

Turning now to FIG. 5, a flow diagram illustrating an example method 500 for assigning program tasks for one or more received jobs is depicted, according to some embodiments. In various embodiments, method 500 may be performed by server computer system 100 of FIGS. 1-4 to assign program tasks 120 for execution in server computer system 100. For example, server computer system 100 may include (or have access to) a non-transitory, computer-readable medium having program instructions stored thereon that are executable by the server computer system to cause the operations described with reference to FIG. 5. Referring collectively to FIGS. 1 and 5, method 500 may begin in block 501.

At block 510, in the illustrated embodiment, the method includes maintaining, by a server computer system, first and second sets of task queues that have different performance characteristics. Server computer system 100 maintains the first set of task queues 110 and the second set of task queues 112. The first set of task queues 110 is used to place ones of program tasks 120 that have estimated execution times that are greater than a threshold amount of time, while the second set of task queues 112 is used to place other ones of program tasks 120 that have estimated execution times that are less than the threshold amount of time.

At block 520, the method includes collecting, by the server computer system, performance metrics relating to processing of program tasks by the first and second sets of task queues. Referring to FIG. 2, performance collection module 230 is used by server computer system 100 to collect performance information from the first set of task queues 110 and the second set of task queues 112. This performance information may include a variety of data regarding the execution of program tasks 120 that have previously been assigned to respective task queues. The collected data is stored as collected performance metrics 104.

The method further includes, at block 530, updating, by the server computer system based on the collected performance metrics, a scheduling algorithm for assigning program tasks to queues in the first and second sets of task queues. Scheduling optimizer 106 retrieves at least a portion of collected performance metrics 104 and determines if changes to scheduling algorithm 108 are warranted. For example, one portion of collected performance metrics 104 may track actual execution times of program tasks that are assigned to each of the first and second sets of task queues 110 and 112. This portion of collected performance metrics 104 may indicate that executed program tasks 250 that were assigned to the first set of task queues 110 actually completed execution in less time than their respective estimated execution times. This portion may also indicate that executed program tasks 250 that were assigned to the second set of task queues 112 took longer to execute than their respective estimated execution times. In response, scheduling optimizer 106 may adjust a threshold value that is used to select between the two sets of task queues. This adjustment may result in an increase in the number of program tasks 120 assigned to the first set of task queues 110 and a corresponding reduction in the number of program tasks 120 assigned to the second set of task queues 112.

At block 540, the method also comprises receiving, by the server computer system, a particular program task associated with a user transaction. Task scheduling module 102 receives a particular program task of program tasks 120. The particular program task is associated with a particular job submitted by a given user of server computer system 100. Task scheduling module 102 also assigns an estimated execution time to the particular program task. This estimated execution time may be determined by identifying one or more previously executed program tasks that are a similar type of task as the particular program task. Using actual execution times for the one or more previously executed program tasks, an estimate is determined for the particular program task.

The method includes, at block 550, selecting, by the server computer system using the updated scheduling algorithm, the first set of task queues for the particular program task. At least a portion of scheduling algorithm 108 may include a threshold value. The estimated execution time determined in block 540 is compared to the threshold value. If the estimated execution time for the particular program task is greater than the threshold value, then task scheduling module 102 selects the first set of task queues 110. Otherwise, task scheduling module 102 selects the second set of task queues 112. In the embodiment of FIG. 5, the estimated execution time is greater than the threshold value and the first set of task queues 110 is selected.

The method further comprises, at block 560, assigning, by the server computer system based on the selecting, the particular program task in a particular task queue in the first set of task queues. After the first set of task queues 110 is selected in block 550, the particular program task is assigned to a particular one of the first set of task queues. The particular task queue may be selected, using the scheduling algorithm, based on one or more criteria, such as a current number of program tasks assigned to each of the first set of task queues 110, an estimated time for each task queue of the first set to execute its respective, currently-assigned program tasks, a quality of service level assigned to the particular program task, and the like. After the particular program task is assigned to the particular task queue, method 500 ends in block 590.

It is noted that, under some conditions, the scheduling process of method 500 may consume more time than just assigning received program tasks to a first available task queue. For example, if the task queues have few assigned program tasks such as may occur after a system reset or an initial boot. In addition, under such conditions, collected performance metrics 104 may include little to no information. When such conditions exist, task scheduling module 102 may default to assigning received ones of program tasks 120 to the first set of task queues 110 until the queues in the first set of task queues 110 reach a particular threshold of pending tasks or reach a particular threshold estimated execution time for the pending program tasks. When the particular threshold is reached, then the operations of method 500 may be performed.

In FIG. 5, method 500 includes operations 501-590. While these operations are shown in a particular order for ease of understanding, other orders may be used. In various embodiments, some of the method operations may be performed concurrently, in a different order than shown, or may be omitted. For example, performance of operations 540, 550, and 560 may overlap with performance of operations 520 and 530. Additional method elements may also be performed, such as determining a quality of service level of a program task before assigning the program task to a particular task queue.

FIG. 5 describes a method for assigning a program task to respective task queue in the first set of task queues. Other program tasks may be assigned to one of the second set of task queues, as demonstrated in FIG. 6.

Figure 6:
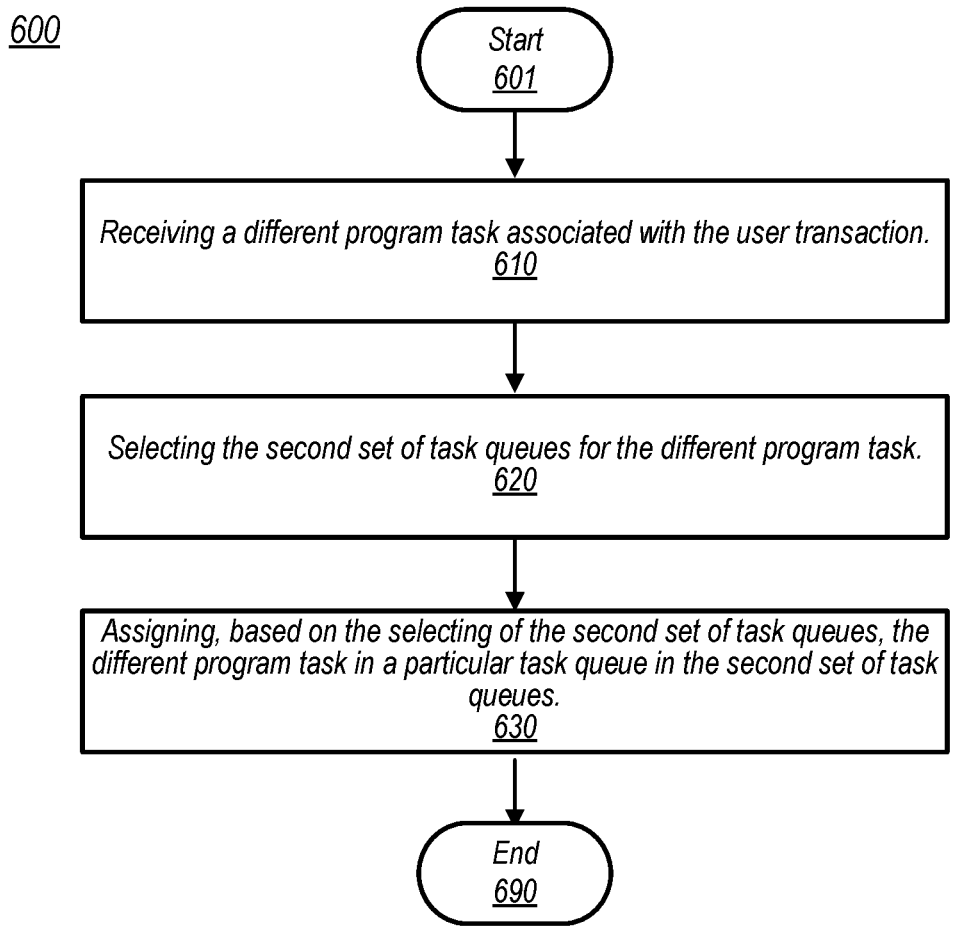
FIG. 6 is a flow diagram illustrating an embodiment of another method for operating a scheduling algorithm using collected performance metrics.

Moving now to FIG. 6, a flow diagram of a method 600 for assigning program tasks to a second set of task queues is illustrated, according to some embodiments. Method 600 may, in some embodiments, be performed by server computer system 100 of FIGS. 1-4 to assign one or more of program tasks 120 into one or more of the second set of task queues 112. Server computer system 100 may, for example, include (or have access to) a non-transitory, computer-readable medium having program instructions stored thereon that are executable by the server computer system to cause the operations described with reference to FIG. 6. As illustrated, the operations of method 600 are shown as occurring after the operations of method 500. This order of occurrence may, however, vary during operation of server computer system 100. Referring collectively to FIGS. 1 and 6, method 600 may begin in block 601.

At block 610, in the illustrated embodiment, the method includes receiving a different program task associated with the user transaction. Task scheduling module 102 receives another program task, different from the particular program task received in method 500. This different program task may be a part of the same job as the particular program task or associated with a different job. In a similar manner as described above, task scheduling module 102 also assigns an estimated execution time to the different program task. This estimated execution time may be based on actual execution times for one or more previously executed program tasks of a same type as the different program task.

The method further includes, at block 620, selecting the second set of task queues for the different program task. The estimated execution time determined in block 610 is compared to the threshold value described in method 500. In the current example, the estimated execution time for the different program task is less than the threshold value and the second set of task queues 112 is selected.

At block 630, method 600 also comprises assigning, based on the selecting of the second set of task queues, the different program task in a particular task queue in the second set of task queues. After selecting the second set of task queues 112, task scheduling module 102 assigns the different program task to a particular one of the second set of task queues 112. As before, the particular task queue of the second set may be selected based on the same one or more criteria described for method 500. After the particular program task is assigned to the particular task queue of the second set, method 600 ends in block 690.

Methods 500 and 600 in FIGS. 5 and 6 describe an example process for assigning program tasks to one of two sets of task queues. Variations of the disclosed methods are contemplated.

Figure 7:
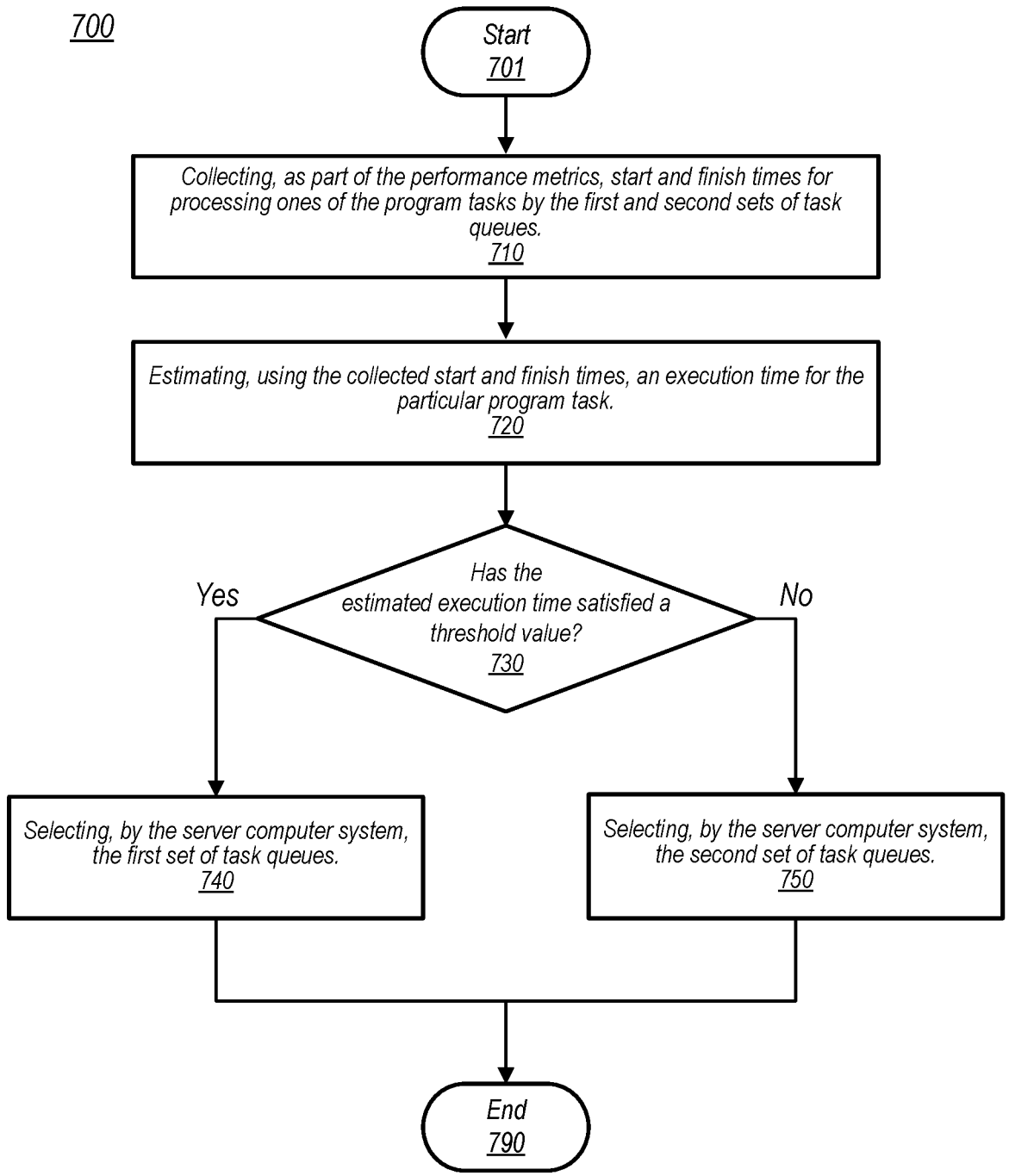
FIG. 7 is a flow diagram illustrating an embodiment of a method for assigning a program task based on an estimated execution time.

Proceeding now to FIG. 7, a flow diagram for another embodiment of a method 700 for assigning program tasks to a plurality of sets of task queues is illustrated. In various embodiments, method 700 may be performed by server computer system 100 of FIGS. 1-4 to assign a particular one of program tasks 120 to either the first set of task queues 110 or the second set of task queues 112. As presented, server computer system 100 may include (or have access to) a non-transitory, computer-readable medium having program instructions stored thereon that are executable by the server computer system to cause the operations described with reference to FIG. 7. Referring collectively to FIGS. 1 and 7, method 700 may begin in block 701.

At block 710, method 700 includes collecting, as part of the performance metrics, start and finish times for processing ones of the program tasks by the first and second sets of task queues. Task scheduling module 102 receives, from the first set of task queues 110, information indicating start times and finish times for executed program tasks that were assigned to the first set of task queues 110. From the second set of task queues 112, task scheduling module 102 receives similar information for executed program tasks that were assigned to the second set of task queues 112. In other embodiments, task scheduling module 102 may receive, instead of start and finish times, a single elapsed time for each executed program task.

Method 700, at block 720, also includes estimating, using the collected start and finish times, an execution time for the particular program task. Task scheduling module 102 (or in other embodiments, scheduling optimizer 106) may generate, as a reference, an estimated execution time for each one of various types of the executed program tasks. For the particular program task, a similar program task is identified in the reference and the corresponding estimated execution time for the similar program task is used for the particular program task. In some embodiments, the estimated execution time may be adjusted based on, for example, a location of data used in the particular program task, and/or a determination if the particular program task has been previously executed within a particular time period.

At block 730, further operations of method 700 may depend on a value of an estimated execution time of the particular program task. Task scheduling module 102 compares the estimated execution time for the particular program task to a threshold amount of time. If the estimated execution time is greater than the threshold amount of time, then the method moves to block 740 to select the first set of task queues 110. Otherwise, the method moves to block 750 to select the second set of task queues 112.

At block 740, method 700 further includes selecting, by the server computer system, the first set of task queues. If the estimated execution time is greater than the threshold amount of time, then task scheduling module 102 selects the first set of task queues 110. The first set of task queues 110 may include, as described above, blocking queues that allow a processor core associated with a particular one of the first set of task queues 110 to block progress of the particular one task queue to instead select a program task from a different one of the first set of task queues 110. For example, if a program task in the particular one task queue is stalled while awaiting data from an external database, then the associated processor core may begin execution on a program task from a different one of the first set of task queues 110. Method 700 ends in block 790.

Method 700 further comprises, at block 750, selecting, by the server computer system, the second set of task queues. If the estimated execution time is less than, or equal to, the threshold amount of time, then task scheduling module 102 selects the second set of task queues 112. The second set of task queues 112 may include, as described above, non-blocking queues that allow an associated processor core to continue executing program tasks from a same task queue of the second set. In some embodiments, each of the non-blocking queues of the second set of task queues 112 may be associated with a respective processor core. Method 700 ends in block 790.

Method 700 describes selecting either the first set of task queues 110 or the second set of task queues 112 for the particular program task. After the particular program task has been assigned to a particular task queue within the selected set of task queues, task scheduling module 102 may, in some cases, reassign the particular task to a different task queue in the selected set.

Figure 8:
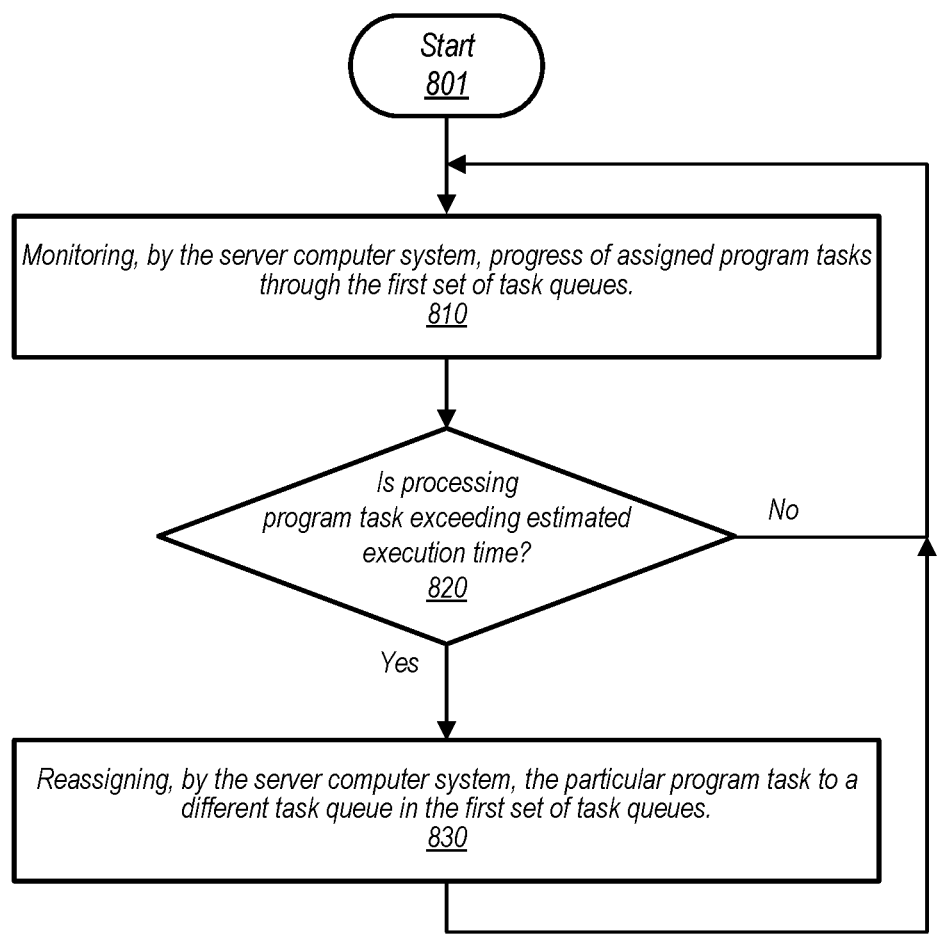
FIG. 8 is a flow diagram illustrating an embodiment of a method for reassigning an assigned program task based on an execution time of a currently processing program task.

Moving to FIG. 8, a flow diagram of an embodiment of a method 800 for rescheduling an assigned program task is illustrated. Method 800 may be performed by server computer system 100 of FIGS. 1-4 to reassign a previously assigned program task to a different task queue in the first set of task queues 110. Server computer system 100 may, in various embodiments, include or have access to a non-transitory, computer-readable medium having program instructions stored thereon that are executable by the server computer system to cause the operations described with reference to FIG. 8. Referring collectively to FIGS. 1 and 8, method 800 begins in block 801 with a particular program task having been assigned to one of the first set of task queues 110.

Method 800 comprises, at block 810, monitoring, by the server computer system, progress of assigned program tasks through the first set of task queues. Server computer system, using, for example, task scheduling module 102, monitors progress of assigned program tasks through the first set of task queues 110, and, in some embodiments, through the second set of task queues 112. Under some conditions, an executing program task may take longer to execute than its estimated execution time. For example, a given program task may include a memory access from a database that is experiencing high demand or that is otherwise taking longer than expected to complete data retrievals. Since scheduling algorithm 108 assigns program tasks based on the estimated execution time, a program task that takes an unexpectedly longer time to execute than anticipated may cause delays in completing a job that includes delayed program tasks, as well as to subsequent jobs. Such delays are undesirable and may result in a job not meeting a contracted quality of service level.

Subsequent operations of method 800 may, at block 820, depend on an actual execution time of a currently processing program task. Task scheduling module 102, in the present embodiment, monitors progress of executing program tasks and determines if an executing program task has exceeded the estimated execution time, thereby stalling progress of the task queue to which the executing program task was assigned. For example, in response to a selected program task starting execution in a respective processor core, task scheduling module 102 may initiate a timer or counter to provide an indication that corresponds to the estimated execution time for the selected program task. If the timer reaches the estimated execution time before the selected program task completes execution, then the method moves to block 830 to reassign the particular program task. Otherwise, if the selected program task completes before the timer reaches the estimated execution time, then the method moves back to block 810 to monitor a next program task.

At block 830, method 800 includes reassigning, by the server computer system, the particular program task to a different task queue in the first set of task queues. In response to the indication that the estimated execution time was reached without the selected program task completing, task scheduling module 102 may reassign one or more program task that are in the same task queue behind the selected program task, including the particular program task. The particular program task is reassigned to another task queue in the first set of task queues 110. One or more criteria may be used by task scheduling module 102 to select the particular program task and any additional program tasks for reassignment. Such criteria may include a quality of service level associated with each program task in a stalled task queue, a determination if a program task in the stalled queue is in a critical path for completion of a respective job, a number of available entries in other queues in the first set of task queues 110, estimated total execution times for program tasks assigned to each of the other queues in the first set of task queues 110, and the like. Once the particular program task and any additional program tasks selected for reassignment have been reassigned, the method returns to block 810 to monitor a next program task.

It is noted that operations described for the methods illustrated in FIGS. 5-8 may be performed by various processor cores in server computer system 100 and, therefore, at least some of the described operations may occur in parallel. In some embodiments, operations from two or more methods may be performed in combination, such as, method 500 and method 800. An example of how methods 500-800 may be applied to systems such as server computer system 100 is presented below. Throughout this example, parenthesized numbers are included to indicate an associated block number of the various methods with which the statement may be associated.

Referring to FIGS. 1 and 5, server computer system 100 maintains the first and second sets of task queues 110 and 112 (block 510), and assigns ones of program tasks 120 to either the first set of task queues 110 or the second set of task queues 112 using scheduling algorithm 108. Server computer system 100 uses information collected during execution of program tasks to update scheduling algorithm 108 (blocks 520, 530). For example, a particular set of program tasks may retrieve a particular type and amount of data from local database 260 (FIG. 2). Execution times for the particular set of program tasks may average to 70 milliseconds (blocks 520, 710). Server computer system 100 may, using scheduling optimizer 106, update scheduling algorithm 108 (blocks 530, 720) such that a subsequently received first program task that also retrieves the particular type and amount of data from local database 260 is estimated to take 70 milliseconds to execute (blocks 610, 720).

Similarly, a different set of program tasks may retrieve a different amount of data from external database 280, and this different set may have an average execution time of 340 milliseconds (blocks 520, 710). Server computer system 100 may again, using scheduling optimizer 106, update scheduling algorithm 108 (blocks 530, 720) such that a subsequently received second program task that also retrieves the particular type and amount of data from external database 280 is estimated to take 340 milliseconds to execute (block 530, 720). Task scheduling module 102 in server computer system 100 compares the estimated execution times for the first and second program tasks to a threshold value, such as 100 milliseconds (block 730). Since the estimated execution time of the first program task (70 milliseconds) is less that the threshold of 100 milliseconds, task scheduling module 102 selects the second set of task queues 112 for the first program task (blocks 620, 750). The estimated execution time of the second program tasks is 340 milliseconds and is, therefore, greater than the 100-millisecond threshold. Task scheduling module 102 selects the first set of task queues 110 for the second program task (blocks 560, 740).

It is noted that, for clarity, only execution time is used for selecting the set of task queues in this example. Other criteria may be used in addition to, or instead of, execution time. For example, other criteria may include priorities of the program tasks, whether a particular task has been executed previously (and has associated information cached), and the like.

To select a particular one of the second set of task queues 112 for the first program task, task scheduling module 102 may utilize one or more criteria, such as a number of previously received program tasks that are assigned to each task queue of the second set of task queues 112 as well as an estimate of an amount of time to execute all pending program tasks in each task queue. Task scheduling module 102 may also select the particular one task queues based on a particular job or process thread that is associated with the first program task. For example, the first program task may be a part of process thread 5 of job number 3. If more than one of the second set of task queues 112 is associated with process thread 5 of job number 3, then task scheduling module 102 may select the one of these associated task queues with a lowest estimated execution time for the pending program task, or the one with the fewest pending program tasks. The first program task is assigned to the selected task queue (block 630). Task scheduling module 102 uses a similar procedure to assign the second program task to a particular one of the first set of task queues 110 (block 560).

As program tasks are executed by one of processing cores 241-244 (FIG. 2), information about the execution of the program tasks is received by performance collection module 230 and stored as collected performance metrics 104. This data is used by scheduling optimizer 106 to determine if further updates to scheduling algorithm 108 are to be made (block 810). In addition, scheduling optimizer 106 may detect that a program task ahead of, and in the same task queue as, the second program task is taking longer than its estimated execution time to complete (block 820). Task scheduling module 102 may reassign the second program task to a different task queue within the first set of task queues (block 830). To determine if the second program task is to be reassigned and if so, to select a different task queue, task scheduling module 102 may utilize similar criteria as used when the original task queue was selected. Task scheduling module 102 may determine a priority of the second program task, and determine numbers and estimated execution times of pending program tasks in the other task queues in the first set of task queues 110. Task scheduling module 102 may determine if a quality of service level associated with the second program task will be met if the second program task remains in the current task queue or is reassigned. After task scheduling module 102 makes a decision, the second program task may be reassigned.

It is noted that some aspects of this example are associated with more than one method, and occur in a different order than presented. As previously stated, the disclosed methods, or portions thereof, may overlap when the operations are performed.

Example Computer System

Figure 9:
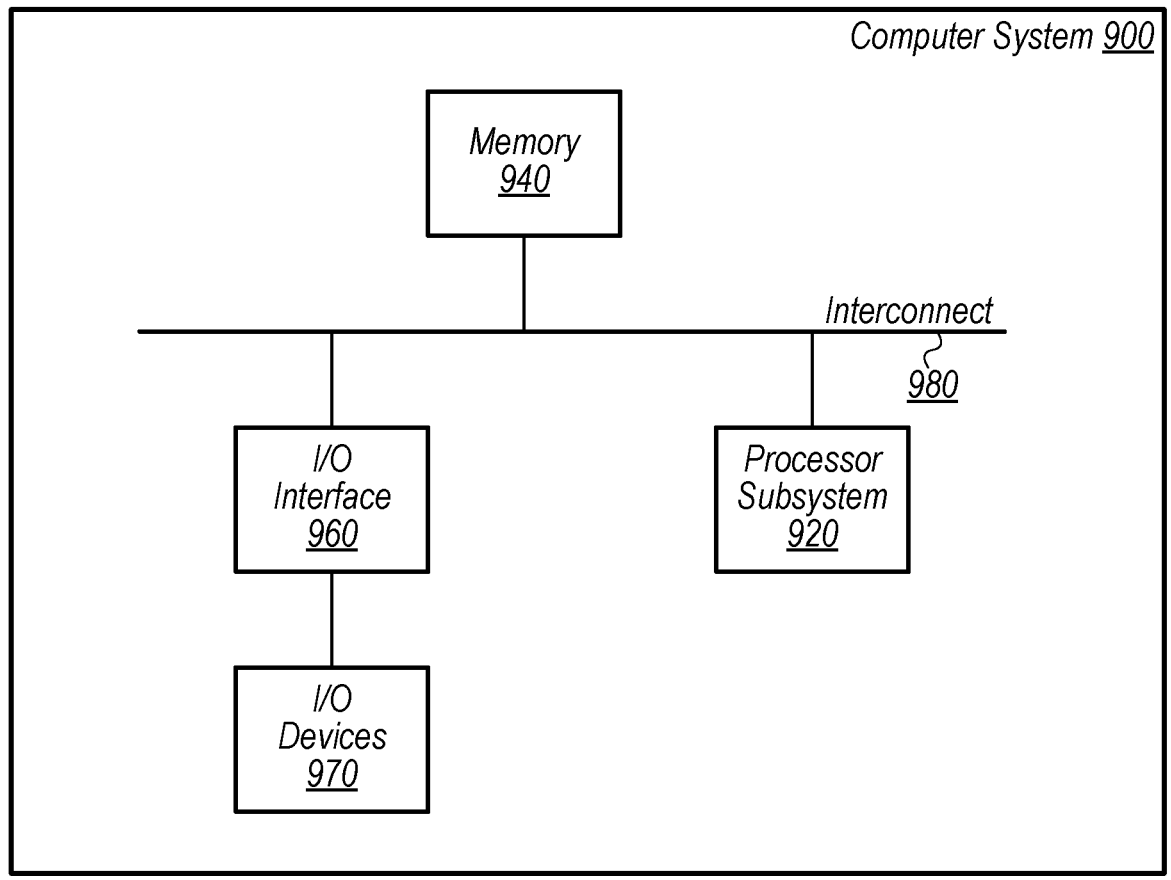
FIG. 9 is a block diagram illustrating an example computer system, according to some embodiments.

Referring now to FIG. 9, a block diagram of an example computer system 900 is depicted, which may implement one or more computer systems included in, for example, server computer system 100 of FIGS. 1-4. Computer system 900 includes a processor subsystem 920 that is coupled to a system memory 940 and I/O interface 960 via an interconnect 980 (e.g., a system bus). I/O interface 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 perform various operations described herein. System memory 940 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interface 960 may include any suitable number of various types of interfaces configured to couple to and communicate with other devices, according to various embodiments. In one embodiment, I/O interface 960 is a bridge chip (e.g., Southbridge) from a front-side to one or more back-side buses. I/O interface 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation— [entity] configured to [perform one or more tasks]— is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., task scheduling module 102). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method performed by a server computer system to update a scheduling algorithm for program tasks that are executed by a processor having a plurality of processor cores, the method comprising:
    distributing the program tasks across first and second sets of task queues that are in a memory accessible by the server computer system, the first set of task queues including blocking queues and the second set of task queues including non-blocking queues;
    collecting performance metrics relating to processing of the program tasks from the first and second sets of task queues that include collected execution times for at least some of the processed program tasks;
    updating, based on the collected performance metrics, the scheduling algorithm for assigning the program tasks to queues in the first and second sets of task queues by modifying a threshold amount of time that is used to assign the program tasks to the first and second sets of task queues;
    receiving first and second program tasks associated with a user transaction;
    estimating respective first and second execution times for the first and second program tasks based on the collected execution times for ones of the processed program tasks that are similar to the first and second program tasks;
    in response to determining that the first estimated execution time is greater than the modified threshold amount of time, storing the first program task in one queue of the first set of task queues;
    in response to determining that the second estimated execution time is less than the modified threshold amount of time, storing the second program task in the second set of task queues;
    pulling, from the one queue of the first set of task queues by a particular processing core of the plurality of processing cores, the first program task; and
    executing, by the particular processing core, the first program task.

2. The method of claim 1, wherein ones of the second set of task queues are associated with respective ones of the plurality of processing cores.

3. The method of claim 1, further comprising adjusting the estimated first and second execution times based on an availability of data associated with the respective first and second program tasks.

4. The method of claim 1, further comprising selecting, by the server computer system, the one queue in the first set of task queues in response to determining that the one queue supports a particular quality of service parameter associated with the first program task.

5. The method of claim 1, further comprising:
repeating the updating of the updated scheduling algorithm; and
in response to use of the repeatedly updated scheduling algorithm, reassigning the first program task to a different task queue in the first set of task queues.

6. The method of claim 1, further comprising moving the first program task from the one queue in the first set of task queues to a different queue in the first set of task queues in response to determining that execution of a different program task in the one queue is exceeding a respective estimated execution time.

7. The method of claim 1, further comprising:
pulling, from the second set of task queues by a given processing core of the plurality of processing cores, the second program task; and
executing, by the given processing core, the second program task.

8. A non-transitory, computer-readable medium storing instructions that, when executed by a server computer system, cause the server computer system to perform operations to update a scheduling algorithm for a plurality of program tasks that are executed by a processor having a plurality of processor cores, the operations comprising:
distributing the plurality of program tasks across first and second sets of task queues that are in a memory accessible by the server computer system, the first set of task queues including blocking queues and the second set of task queues including non-blocking queues;
collecting performance metrics, including collected execution times of at least some processed program tasks, relating to processing of the plurality of program tasks from the first and second sets of task queues;
updating, based on the collected performance metrics, the scheduling algorithm for assigning the plurality of program tasks to task queues in the first and second sets of task queues by modifying a threshold amount of time that is used to assign the plurality of program tasks to the first and second sets of task queues;
estimating respective first and second execution times for a first program task and a second program task of the plurality of program tasks based on the collected execution times for ones of the processed program tasks that are similar to the first and second program tasks;
in response to determining that the first estimated execution time is greater than the modified threshold amount of time, storing the first program task in one queue of the first set of task queues;
in response to determining that the second estimated execution time is less than the modified threshold amount of time, storing the second program task in the second set of task queues;
receiving, from the one queue of the first set of task queues by a particular processing core of the plurality of processing cores, the first program task; and
executing, by the particular processing core, the first program task.

9. The non-transitory, computer-readable medium of claim 8, wherein ones of the second set of task queues are associated with respective ones of the plurality of processing cores.

10. The non-transitory, computer-readable medium of claim 8, wherein the operations further comprise selecting, in response to determining that data to be used to process the first program task is located in a database that is external to the server computer system, selecting the first set of task queues for the first program task.

11. The non-transitory, computer-readable medium of claim 8, further comprising selecting the first set of task queues for a different program task of the plurality of program tasks in response to determining that an insufficient amount of performance metrics have been collected to estimate execution times for the different program task.

12. The non-transitory, computer-readable medium of claim 8, wherein the operations further comprise moving the first program task from the one queue to a different queue in the first set of task queues in response to execution of a different program task in the one queue exceeding an estimated execution time.

13. The non-transitory, computer-readable medium of claim 8, wherein the operations further comprise selecting the one queue in the first set of task queues in response to determining that the one queue supports a particular quality of service parameter associated with the first program task.

14. The non-transitory, computer-readable medium of claim 8, wherein the collected performance metrics includes respective start and finish times for executed program tasks.

15. A system comprising:
a memory storing instructions; and
a processor configured to update a scheduling algorithm for a plurality of program tasks that are executed by a plurality of processor cores by executing the instructions to cause the system to:
assign, using the scheduling algorithm, the plurality of program tasks into a set of blocking queues and a set of non-blocking queues that are maintained in the memory;
based on execution of the plurality of program tasks from the sets of blocking and non-blocking queues, collect performance metrics of processed ones of the plurality of program tasks that include collected execution times for at least some of the processed program tasks;
update, using the collected performance metrics, the scheduling algorithm by modifying a threshold amount of time that is used to assign the plurality of program tasks to the sets of blocking and non-blocking queues;
estimate respective first and second execution times for a first program task and a second program task of the plurality of program tasks based on the collected execution times for ones of the processed program tasks that are similar to the first and second program tasks;
determine, based on a comparison of the first execution time to the modified threshold amount of time, to store the first program task in the set of blocking queues;
determine, based on a comparison of the second estimated execution time to the modified threshold amount of time, to store the second program task in the set of non-blocking queues; and
pull and execute, at respective points in time, the first and second program tasks from respective blocking and non-blocking queues.

16. The system of claim 15, wherein executing the instructions further causes the system to adjust the estimated first and second execution times based on an availability of data associated with the respective first and second program tasks.

17. The system of claim 15, wherein executing the instructions causes the system to make the modification of the threshold amount of time based on a first number of program tasks assigned to the set of blocking queues and a second number of program tasks assigned to the set of non-blocking queues.

18. The system of claim 15, wherein the collected performance metrics include a failure indication that is set for a type of program task if a previously executed program task of the type failed to complete, and wherein executing the instructions further causes the system to select the set of blocking queues for a different one of the same type of program task in response to a determination that the failure indication is set for the type of program task.

19. The system of claim 15, wherein each non-blocking queue of the set of non-blocking queues is associated with a respective one of the plurality of processing cores included in the processor.

20. The system of claim 19, wherein each of a subset of the plurality of processing cores is associated with two or more blocking queues of the set of blocking queues.

\* \* \* \* \*